D. G. CAREY.
UTERINE SUPPORTER.
APPLICATION FILED OCT. 5, 1911.
1,162,568.
Patented Nov. 30, 1915.
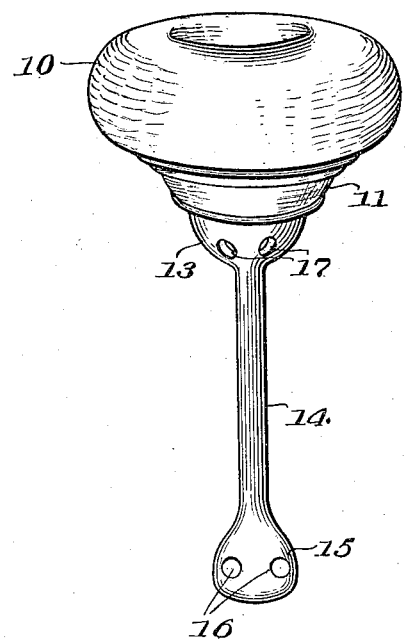
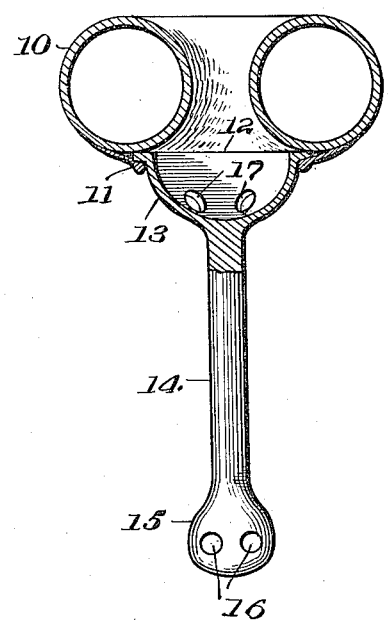
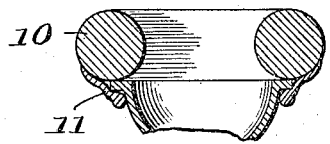
Witnesses
J. Adolph Bishop
B. M. Kent.
Inventor
Daniel G. Carey
by
Foster, Freeman, Watson & Coit
Attorneys

UNITED STATES PATENT OFFICE.

DANIEL G. CAREY, OF ELMIRA, NEW YORK.

UTERINE SUPPORTER.

1,162,568.  Specification of Letters Patent.  Patented Nov. 30, 1915.

Application filed October 5, 1911. Serial No. 653,043.

*To all whom it may concern:*

Be it known that I, DANIEL G. CAREY, a citizen of the United States, and resident of Elmira, county of Chemung, State of New York, have invented certain new and useful Improvements in Uterine Supporters, of which the following is a specification.

The object of this invention is to provide an improved form of uterine supporter which may be readily and conveniently placed in position and removed and which will remain in any position to which it may be adjusted without discomfort to the patient and will not interfere with the ordinary functions of the uterus.

The novel features of the invention will be apparent from the following description, taken in connection with the accompanying drawings.

In the drawings: Figure 1 is a perspective view of the preferred form of my invention. Fig. 2 is a longitudinal section of the supporter shown in Fig. 1. Fig. 3 is a longitudinal section of a modified form of the invention.

Referring to the drawings, it will be seen that the invention comprises a ring 10, which is preferably hollow and sealed to prevent the escape of air therefrom. The ring may be made of rubber or any other suitable material and, instead of the hollow ring shown in Fig. 2, I may use the solid ring shown in Fig. 3 and made of very pliable material. On one side of the ring 10 is arranged a flexible flange 11, which is adapted to engage and securely hold the flange 12 of the cup 13, formed on one end of the stem 14. The other end of the stem 14 is provided with a knot 15, having openings 16, extending therethrough. The stem 14 is preferably made of hard rubber or other suitable hard material.

When the supporter is in use the uterus rests in the central opening in the ring 10, which is held in position by means of the stem 14. The openings 16, in the knot 15, permit the device to be supported by straps from the waist-band or in any other suitable manner, and openings 17, in the cup 13, allow the free passage of any discharges from the uterus.

The advantages of the invention will be readily understood by physicians and others familiar with the use of such devices.

Having thus described my invention, what I claim is:

In a uterine supporter, the combination of a flexible ring having on one side thereof an inwardly projecting flange, of flexible material, and a stem of rigid material having at its outer end means for attaching a support thereto and having at its inner end a hemispherical cup, provided with openings in its walls, and an outwardly projecting flange engaging the flange on said ring, and the flange on said stem being of larger external diameter than the internal diameter of the flange on said ring whereby said parts are securely held together.

In testimony whereof I affix my signature in presence of two witnesses.

DANIEL G. CAREY.

Witnesses:
 R. E. ENNIS,
 M. A. DUNHAM.

Copies of this patent may be obtained for five cents each, by addressing the "Commissioner of Patents, Washington, D. C."